May 3, 1960 L. M. LEEDS 2,935,644

DEFLECTION CIRCUIT

Filed April 28, 1959 3 Sheets-Sheet 1

INVENTOR.
Laurance M. Leeds

BY Isidore Match

ATTORNEY

May 3, 1960 L. M. LEEDS 2,935,644

DEFLECTION CIRCUIT

Filed April 28, 1959 3 Sheets-Sheet 2

INVENTOR.
Laurance M. Leeds
BY Isidore Match
ATTORNEY

May 3, 1960 L. M. LEEDS 2,935,644

DEFLECTION CIRCUIT

Filed April 28, 1959 3 Sheets-Sheet 3

INVENTOR.
Laurance M. Leeds
BY Isidore Match
ATTORNEY

United States Patent Office 2,935,644

Patented May 3, 1960

2,935,644

DEFLECTION CIRCUIT

Laurance M. Leeds, Syracuse, N.Y., assignor to General Electric Company, a corporation of New York Application April 28, 1959, Serial No. 809,566

11 Claims. (Cl. 315—27)

Figure 1:
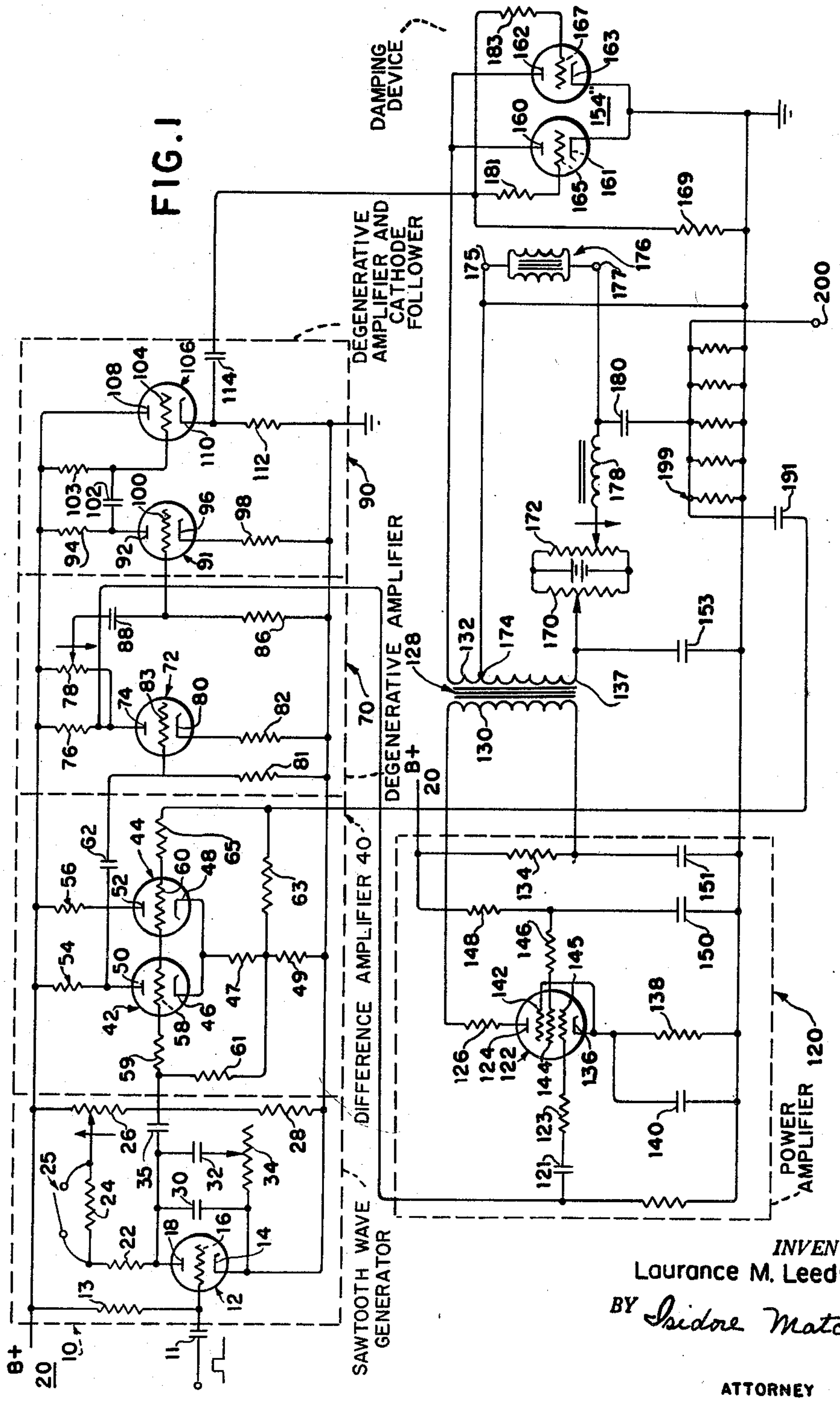

This invention relates to cathode ray deflection circuits and is particularly directed to such deflection circuits having improved linearity of line rate of scanning.

It has been the practice in deflection circuits of this type to provide an electron discharge tube having a relatively high power output for supplying energy to the beam deflecting coils. Across these deflection coils there is usually connected a damping device, the purpose of which is to eliminate high frequency oscillations which are otherwise set up in the deflecting coils during retrace time and also to aid in the deflection of the cathode ray during a part of each deflection cycle. The damping device serves as a periodic discharge path for the electromagnetic energy stored in the deflecting coils or other circuit inductance at the end of the deflection cycle. In the absence of the damping device, this stored energy would normally produce relatively high frequency oscillations in the system with the concomitant result that the deflection of the cathode ray during the initial part of its deflection cycle would be non-linear. When a damping device is so used, only one-half cycle of such free oscillation is permitted to take place and thereafter the energy contained in the deflecting coils or other circuit inductance is used for the initial part of the next deflection cycle.

When a power tube and damping device are used in the above described manner, the circuit constants have normally been chosen such that the power tube does not supply energy at least during approximately the first 30% of the deflection cycle and the damping device is usually rendered non-conductive at least during approximately the last 30% or so of the cycle. It has been found that the summation characteristic of the output of the power tube and the damping device is not linear and consequently distortion of the reproduced image may occur. To overcome this non-linearity, various feedback arrangements have been used such as from the deflection coils or transformer secondary to the deflection wave generator or to the input to the power tube respectively. Such feedback arrangements have improved somewhat the linearity of the line rate scanning and since use for television up to now has been essentially in the field of entertainment, the linearity of scanning provided by known deflection circuits employing the above described feedback has been relatively adequate.

However, many new applications for television systems are now developing in fields other than that of entertainment. Many of these applications utilize a single tube camera either in a monochrome or in a field sequential system. In some of the newer applications such as those that involve the pick-up of maps, characters, coordinates and related information, etc., it has become essential that the line rate scanning be substantially perfectly linear.

Also, in the field of color television wherein live color television pick-up utilizes a camera employing three image orthicon tubes in which the electron beams are deflected simultaneously, each of the tubes being responsive to one of the three primary colors in order to obtain an acceptable color picture with adequate resolution, it is essential that the three pictures be precisely registered. Since the deflection coils cannot be exactly identical nor can the camera tubes be precisely equal in their deflection sensitivity, it has been the common practice in this situation to provide each of the deflection coils with differential controls for size, skew and "Q" and to drive the three deflection coils and their associated differential circuits with a common deflection system. Here again, any instability or drifting of any portion of the entire deflection system will tend to destroy the registration with consequent color fringing and picture degradation.

It is, accordingly, a primary object of this invention to provide a cathode ray deflection circuit having improved linearity of line rate scanning.

It is a further object to provide a cathode ray deflection circuit having a high degree of stability both as to amplitude and wave form.

It is another object to provide a cathode ray deflection circuit which is simple and easy to adjust and which the amplitude and linearity are essentially independent.

An important feature of the invention is the use of an adequate amount of overall negative feedback in the deflection circuit throughout the whole deflection period to correct for any drifting in the circuit.

Another important feature of the invention is the use of negative feedback to automatically correct the wave of the current in the deflection coils to a predetermined linearity.

Generally speaking in accordance with the invention, there is provided a deflecting circuit for a cathode ray comprising a source of cyclically varying current, a transformer having a primary winding and a secondary winding, the primary winding being connected to the source of cyclically varying current and a cathode ray deflection coil connected in shunt with the secondary winding. The current through the coil increases to a predetermined value in accordance with the increase in current from the source, the current from the source being cut off after the current through the coil rises to the predetermined value whereby the current in the deflection coil circuit after rising to such predetermined value is set into oscillation at a frequency determined by the effective inductance and capacitance of the deflection coil circuit. An electron discharge device having at least a cathode control electrode and an anode for damping these current oscillations after the first-half cycles of such oscillations is connected so as to have its anode to cathode path in shunt with the secondary winding. The source of cyclically varying current comprises means for generating a cyclically varying potential, means responsive to the application thereto of the cyclically varying potential and a potential proportional to the current flowing through the coil for providing a potential in accordance with a difference therebetween, a power tube having an input and an output circuit, means for applying the output of the difference means to the input circuit of the power tube and to the control electrode of the damping device, the transformer coupling the output of the power tube to the deflection coil. The power tube and the damping discharge device are chosen to have respective operating points such that there is sufficient overlap in their respective conductions in the region of the center of the scansion such that conduction subsists throughout substantially the entire scansion period between the end of one of the first-half cycles of the oscillations and the beginning of the next of the first-half cycles of the oscillations whereby the overall feedback is effective over substantially the entire sweep cycle. Effectively, the circuit is class AB operated, the power tube being conductive at least during the latter half of the scansion period and the damping discharge is conductive during at least the first-half of the aforesaid scansion period.

The novel features, which are believed to be characteristic of this invention, are set forth with particularity in the appended claims. The invention itself, however, both as to its organization and method of operation together with further objects and advantages thereof may best be understood by reference to the following description taken in connection with the accompanying drawings.

In the drawings, Fig. 1 is a schematic representation of a deflection circuit embodying my invention and which is adaptable for use in a single tube camera system.

Figure 2:
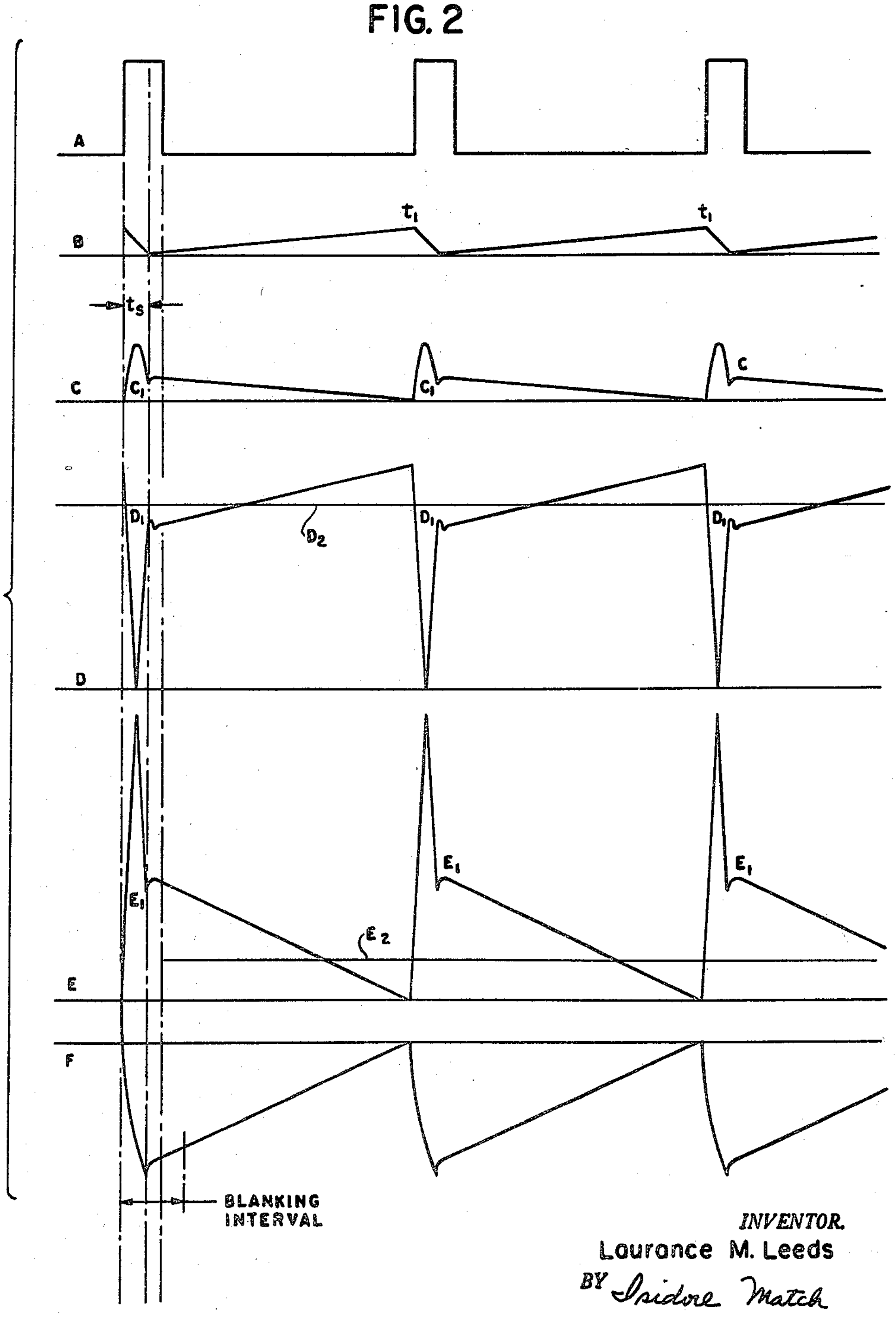
Figure 3:
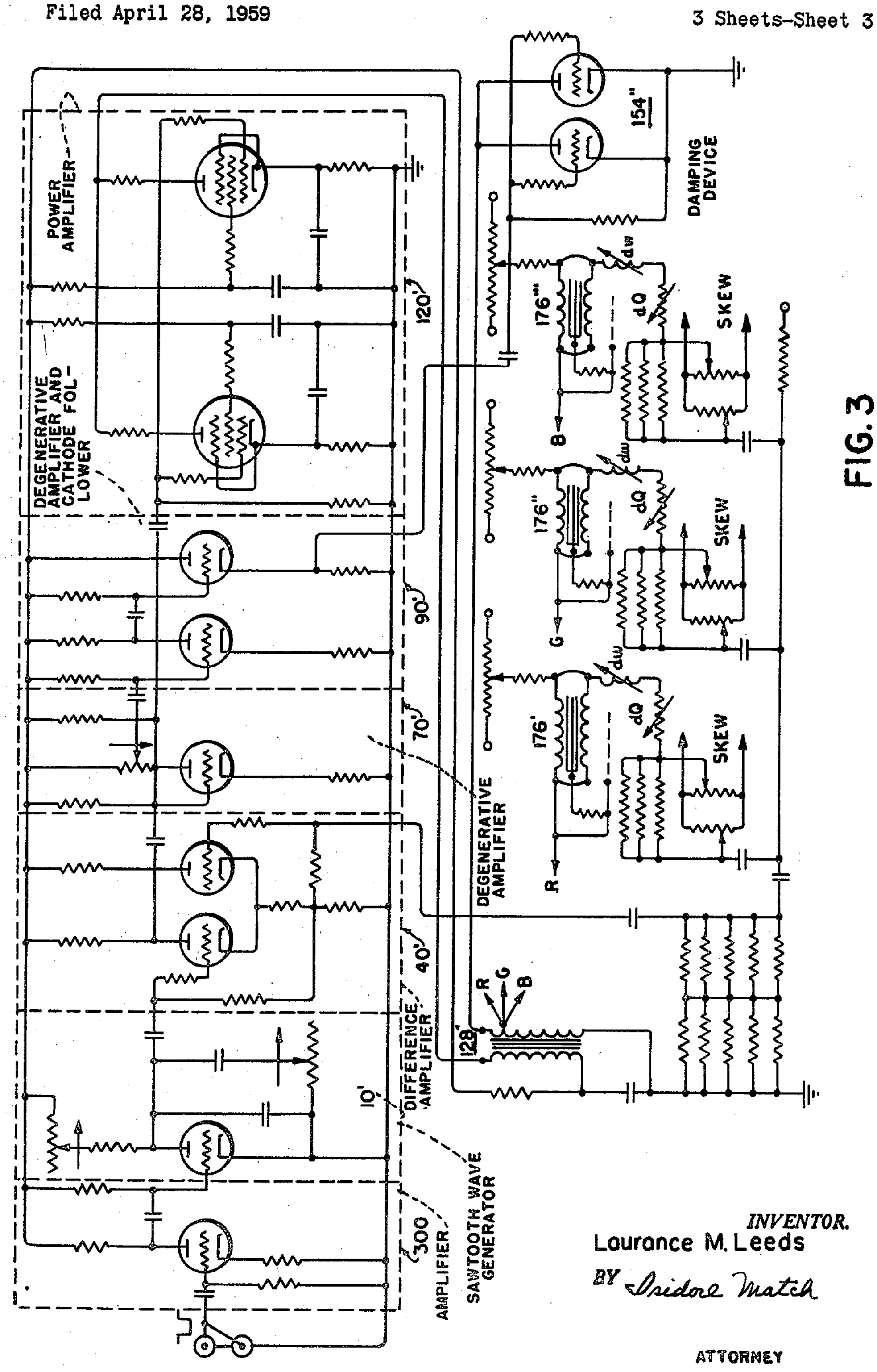

Fig. 2 is a group of diagrams utilized to explain the operation of the embodiment of this invention shown in Fig. 1; and, Fig. 3 is a schematic depiction of a deflection circuit embodying my invention which may be used with a three tube camera system such as is found in the field of color television.

Referring now to Fig. 1 wherein there is shown a circuit embodying my invention and adaptable for use in a one tube camera system, that portion of the circuit enclosed by the dashed line and designated by the numeral 10 is a means for generating a cyclically varying potential such as a voltage wave having a saw tooth configuration. It comprises an electron discharge tube 12 having a cathode 14, a control grid 16 and a plate 18. The cathode 14 is grounded and plate 18 is connected to a source 20 of B+ potential through a resistor 22, a resistor 24 having a switch 25 thereacross to enable its being removed from the circuit, and a variable resistor 26 which is connected to ground through a resistor 28. Shunting tube 12 are a capacitor 30 and a differential modification circuit comprising a capacitor 32 and a variable resistor 34, one end of resistor 34 being connected to ground. In accordance with the operation of saw tooth wave generators, tube 12 is so biased as to normally be non-conductive in its quiescent state. During such non-conductive period, capacitor 30 charges. Upon the application of a discharge pulse to tube 12, it is rendered conductive permitting capacitor 30 to rapidly discharge therethrough. The circuit comprising capacitor 32 and variable resistor 34 functions as a limited range predistortion circuit in that it modifies the substantially linear saw tooth wave output of tube 12 by applying a controlled small amount of curvature during approximately the first 20% of the scansion wave form. As will be further explained hereinbelow, it is during this time that the damper device is operating at its utmost to correct, under the control of the negative feedback, the resultant yoke, i.e., the deflection current to a linear saw tooth form. Since the amount of such correction required utilizes the feedback to its limit, by inserting a small and controlled amount of predistortion, the negative feedback is greatly increased in effectiveness. As will also be further brought out hereinbelow, such insertion of small and controlled amount of predistortion permits a fine control for differential linearity at the left hand side of the picture, i.e., the start of scansion. The arrangement of resistor 22, removable resistor 24, and variable resistor 26 permits the size of the generated saw tooth wave resulting from the operation of generator 20 to be varied between wide limits. The pulses applied to control grid 16 for rendering tube 12 periodically conductive to discharge capacitor 30 may suitably be obtained from a self-blocking oscillator (not shown) or like pulse generating device. Such pulse generating device may be driven, for example, in a television system by the horizontal drive pulse.

The output of saw tooth wave generator 10 is applied through a capacitor 35 to the input of a difference amplifier designated by the numeral 40. Difference amplifier 40 comprises an electron discharge tube 42 and an electron discharge tube 44, suitably contained in a single envelope, and their respective associated circuit elements. Tube 42 with its associated circuit elements is a conventional amplifier and tube 44 with its associated circuit elements is a cathode follower. Cathodes 46 and 48 are connected to ground through common series arrangement of resistors 47 and 49 and plates 50 and 52 are connected to B+ source 20 through resistors 54 and 56 respectively, resistor 56 being chosen to have a relatively small value. The input to control electrode 58 through a resistor 59 is a positive going voltage of saw tooth configuration and having a predetermined linearity to which the output of the system corrects itself. The input to control electrode 60 through a resistor 65 is a positive going voltage of substantially saw tooth configuration from the deflection coil which is proportional to the current passing through such coil. The output appearing at plate 50 is the negative going voltage of saw tooth configuration which is proportional to the difference between the input voltages to the difference amplifier 40. Effectively, difference amplifier may be designated in this situation as a feedback mixer.

The output of difference amplifier 40 is applied through a capacitor 62 to the grid 83 of a degenerative amplifier designated by the numeral 70. Amplifier 70 comprises an electron discharge tube 72 having a plate 74 connected to B+ source 20 through a resistor 76 and also connected to the B+ source through a variable resistor 78, the cathode 80 being grounded through an unbypassed resistor 82.

One output of amplifier 70 which is a positive going saw tooth voltage is applied to the input of a power amplifier. Another output is taken from a point on variable resistor 78 and applied through a capacitor 88 to an amplifier 90. Amplifier 90 comprises a first degenerative amplifier comprising an electron tube 91 having a plate 92 connected to B+ source 20 through a resistor 94 and a cathode 96 connected to ground through an unbypassed resistor 98. The input from variable resistor 78 is applied to a control grid 100. The output at plate 92 which is a negative going saw tooth voltage is applied through a capacitor 102 to the control grid 104 of an electron tube 106 connected as a cathode follower. Plate 108 of tube 106 is directly connected to the B+ source 20 and cathode 110 is connected to ground through resistor 112. It is to be noted that the return of grid 104 to the B+ source through resistor 103 provides for linear large signal excursion. It is seen that if grid 104 were returned instead, for example, to ground, cathode 110 would still be positive but such large signal excursion could not occur since the signal would be clipped quite quickly.

The output at cathode 110 is applied to a damping electron discharge device through a capacitor 114 as will be further explained hereinbelow.

Power amplifier 120 to which the output is applied from plate 74 through a capacitor 121 includes a power tube 122 comprising a plate 124 connected through a resistor 126 to the high potential end of primary winding 130 of a transformer 128, and through primary winding 130 and a resistor 134 to B+ source 20. Cathode 136 is connected to ground through a resistor 138 bypassed by a capacitor 140. The suppressor grid 142 is tied to cathode 136 and the screen grid 144 is connected to the B+ source through resistor 146 and a resistor 148, the junction of resistors 146 and 148 being grounded through a capacitor 150. The circuit values of the components associated with power tube 122 are so chosen as to maintain conduction throughout approximately the latter 65 or 70% of the rising portion of the saw tooth wave produced by generator 10; i.e., conduction in power tube 122 ceases at the initiation of flyback and is not resumed until a time corresponding to about ⅓ of the scansion cycle.

Secondary winding 132 has one end thereof connected to the plates 160 and 162 of damper electron discharge device 154. The other end of secondary winding 132 is grounded through a capacitor 153 and is connected by a tap to a point on variable resistor 170.

An intermediate point 174 on secondary winding 132 is connected to one terminal 175 of a cathode ray deflection coil 176, the other terminal 177 of deflection coil 176 being connected through an inductance 178 and by a tap to a point on variable resistor 172. Terminal 177 is also connected to ground through a capacitance 180. Damper discharge device 154 includes cathodes 161 and 163 which are grounded and isolating resistors 181 and 183 through which the output from the cathode 110 at tube 106 is simultaneously applied to control grids 165 and 167 through capacitor 114.

In considering the operation of the device of Fig. 1 it is convenient to examine the graphs shown in Fig. 2 in connection with the explanation of such operation. In graph A, the abscissa represents time and the ordinate represents the general form of the voltage pulse applied to the input of tube 12 of saw tooth wave generator 10. In graph B the abscissa represents time and the ordinate represents the voltage appearing at plate 18 and at control grid 58.

In graph C, the abscissa represents time and the ordinate represents the voltage appearing at the plate of tube 42 and at the control grid 83 of tube 72. In graph D, the abscissa represents time and the ordinate represents the voltage appearing at the plate 74 of tube 72 and at the grid 145 of power tube 122, line $D_2$ indicating the level that above which tube 122 conducts. In graph E, the abscissa represents time and the ordinate represents the voltage appearing at the cathode 110 of tube 106, and at the grids 165 and 167 of damper device 154, line $E_2$ indicating the level below which the damping device is rendered non-conductive. In graph F the abscissa represents time and the ordinate represents current flowing through the deflection coil 176. The graphs of Fig. 2 are drawn to the same time scale and points on the graphs lying in a straight line perpendicular to the time axis represent generally simultaneous conditions of voltage and current in the circuit of Fig. 1.

Referring now to the operation of the circuit of Fig. 1, a positive going saw tooth voltage represented by graph B of Fig. 2 is applied to grid 58 of tube 42. Simultaneously a feedback voltage proportional to the current flowing through deflection coil 176 is applied to grid 60 of tube 44. The voltage appearing at plate 50 depicted in graph C of Fig. 2 is applied to the input of degenerative amplifier 70. The output of amplifier 70 which is a positive going saw tooth having the configuration as depicted in graph D of Fig. 2 is applied simultaneously to the input of power amplifier 120 and via a tap on variable plate resistor 78 to the input of tube 91. The inverted output from the latter is applied to cathode follower tube 106 and the negative going saw tooth voltage produced therefrom is applied to both grids of the damping device 154.

The output of power tube 122 is applied to the primary winding of transformer 128, the current flowing through secondary winding 132 driving the deflection coil 176. Since at the time $t_1$ represented by the maximum point of the saw tooth voltage from generator 10, the voltage on the control grid 145 of power amplifier tube 122 is driven in a negative direction very rapidly resulting in complete cut-off thereof, a self-oscillation is caused in the transformer deflection coil circuit at a frequency determined approximately by the self-inductance of deflection coil 176 and all of the distributed capacitances of the deflection coil transformer and circuit as reflected across the deflection coil. This frequency of self-oscillation is such that the first-half cycle occurs approximately during the time $t_s$ interval represented on the graphs on Fig. 2.

As the oscillation tends to continue beyond this half cycle, the electron discharge tubes of damper device 154 are caused to conduct and to damp deflection oscillation in the transformer deflection coil circuit to cause a gradual decrease of current in the deflection coil instead of undesirable oscillatory variations of current at high frequency which disturb the linear variation of current therein. In this connection, it is to be noted, that different from known devices wherein the grids of the damping device are driven from the high potential side of secondary winding of the deflection circuit transformer, damping device 154 in accordance with the principles of this invention is a double triode driven by the output from a low impedance generator, i.e., cathode follower tube 106.

At this point in the description of the operation of the circuit of Fig. 1, it is convenient to define certain concepts.

In class A operation of a tube, conduction occurs over the entire 360° cycle (usually the bias and signal level is such that the operation is substantially linear). In class B operation, conduction occurs over 180° of the cycle. Hence, in most applications where class B operation is employed, two tubes are used and are driven antiphase so that at least one tube is conducting over the entire cycle.

In class C operation, conduction occurs over a portion of the cycle which is less than 180°. In the case of sine wave operation, class C operation accordingly requires a tuned plate circuit with sufficient stored energy capability to restore the sine wave voltage swing since plate current is drawn as a pulse over only a small portion of the cycle.

Class AB operation is operation between class A and class B, i.e., a tube is operated to conduct less than 360° (the entire cycle) and more than 180° (a half cycle). Class AB operation, as so defined, is generally accepted as the generic term for describing operation where conduction occurs in the aforesaid manner. Class AB operation has been broken down into two categories; class $AB_1$ wherein all the conditions necessary for operation are present and with the further requirement that the maximum excitation is not sufficient to draw grid current and class $AB_2$ wherein all the conditions necessary for class AB operation are present but wherein the grid draws current at the peaks of excitation and thus establishes additional bias.

In a deflection system wherein class A operation is employed, i.e., the power tube conducts over the entire cycle, generally there is no need for a damper tube since the driver, i.e., the power tube is always conducting and is always connected to the deflection coil, through the transformer. Such arrangements are well known and almost always employ feedback. The tube operation is relatively linear (at least such linearity is sought after). The tube generally is always connected to the load and, in effect, forces the load current to follow under its control.

Such class A operation deflection circuits are utilized when the deflection requirements are very small and the poor efficiency of the class A operation system can be tolerated. However, where the deflection current requirement is considerable, then class A operation could require power tubes of a great size, e.g., ¼ kw. to 1 kw. of plate dissipation.

Now, referring back to Fig. 2, in curve D, line $D_2$ indicates the level at which conduction is initiated in power tube 122. This is at about the 30% to 35% point of the positive going portion of the input voltage to grid 145 and this is the portion of the scansion period that the power tube draws plate current.

The voltage across the secondary winding 132 of transformer 128 and deflection coil 176 is similar to the configuration of the voltage of curve D, except that its positive going portion is less steep and rises to a smaller peak. If there were zero resistance in the transformer and the deflection coil, there would only be required as voltage across the deflection coil, a negative pulse of suitable amplitude with a width about equal to and occurring at the end of the period $t_s$. This may be readily understood from the following.

Since the voltage across the deflection coil $$E=L\frac{di}{dt} \quad (1)$$

If E is constant, then $$di=\frac{E}{L}dt \quad (2)$$

and $$i=\int\frac{E}{L}dt=\frac{E}{L}t \quad (3)$$

That is, the current $i$ is linearly proportional to time and there would be a perfect saw tooth wave of current through the deflection coil.

However, the resistance in the circuit changes Equation 1 to $$E=L\frac{di}{dt}+Ri \quad (4)$$

From Equation 4 it is seen that to the constant voltage, there has to be added a component which increases with time. This is the reason that a small saw tooth voltage component is applied to the deflection coil.

Actually, the above analysis is quite simplified and approximate since there has been neglected many other losses such as core loss in both the transformer and deflection coil, tube curvature etc., such losses not having the form of a constant resistance. In practice, the voltages are slightly distorted to obtain a linear current in the deflection coil, i.e., a resultant linear scan of the target electron beam on the target itself.

At the instant that the power tube is rendered non-conductive, there are present the conditions necessary for a freely oscillating system with substantially all of the energy stored in the inductive branches of the system. At this instant, since the damper tube had already been rendered non-conductive after about the first ⅔ of the scansion period, the system is effectively completely free.

Immediately, there commences the transfer of the energy in the inductive branches to the capacitive branches of the system and this transfer is complete after ¼ cycle of the free resonant frequency of the system. During this ¼ cycle the swing, the voltage at the plate of the power tube rises to its positive peak and the voltage at the deflection coil falls to its negative peak. The energy (reduced slightly by losses) is now transferred back to the inductive branches of the circuit, the transfer occurring during the next quarter cycle of the free resonant frequency. Oscillation tends to persist (i.e., the negative going swing of the voltage at the plate of the power tube and the positive going swing of the voltage across the secondary winding of the transformer, the voltage across the deflection coil and the voltage at the plates of the damper device). But at the instant of commencement of oscillation, the damper device was in a non-conducting state permitting the system to be free. As the oscillation is initiated, a positive going voltage is applied to the grids of the damper device but it remains non-conductive because the plate voltage thereof went negative through so large an excursion and at such a rate that no conduction therein was possible.

With the completion of the first-half cycle of the free resonant frequency, as a result of the oscillatory voltage, the plate voltage at the damping device attempts to go positive. Simultaneously at this time, the control grids of the damper device are positive relative to the cathode thereof. This results in momentary very heavy conduction in the damper device; substantially the entire space charge electron plasma is drawn to the plate thus constituting a large load on the oscillating system. The oscillation is thereby arrested but the inductive branches of the stystem, at this instant, contain stored energy which is only slightly less (because of the losses occurring during the ½ cycle of oscillation) than they contained at the instant that the power tube was rendered non-conductive. This stored energy is now permitted to discharge into the damper device under the control of the voltage at the grids thereof. Conduction persists in the damper device for about the first ⅔ of the scansion time, the wave form at the control grids thereof being such as to control this discharge of energy from the deflection coil so that a substantially linear current flows through the deflection coil. The conduction periods of the power tube and the damper device overlap by an appreciable amount and the feedback automatically selectively operates on the control grid voltage of both the power tube and the damper device to provide a linear scan as a result thereof. It is to be observed that the grid voltages applied to the power tube and the damper device although of the same general wave form are of appreciably different amplitudes.

It is to be noted that damping device 154 is connected in shunt with the entire secondary winding 132 whereas coil 176 is connected in shunt across that portion of secondary winding 132 between the point designated by the numeral 174 and its lower end. By this arrangement, an auto transformer action is obtained. It has been found that such auto transformer action is, in general, essential in those applications wherein the A.C. voltage swing across the deflection coil for the required deflection current, is not sufficient to properly operate damper device 154. By stepping up this voltage through auto transformer action, proper damper device operation is obtained. In general, the leakage reactance between the two sections of the secondary winding must be minimized; however the small amount of unavoidable leakage reactance is offset by the feedback. The application to the grids 165 and 167 of damper device 154 of the output from a cathode follower in conjunction with the use of two tubes in parallel connection as shown in device 154 has been found to be advantageous in that it permits relatively large currents to flow in the damper device, particularly at that time when damping action is required. The parallel arrangement of adjustable resistors 170 and 172 is a conventional means for adjusting centering by applying a D.C. bias current through deflection coil 176. Choke coil 178 isolates the A.C. secondary currents from the centering circuit, the A.C. return circuit for the deflection currents being from deflection coil terminal 177 through bypass capacitor 180, feedback voltage sensing resistors 199 and bypass capacitor 153 to the lower end 137 of secondary winding 132.

When the circuit of Fig. 1 is in use, variable resistor 78 in the plate circuit of degenerative amplifier 70 is the coarse control of linearity and variable resistor 34 in the output of saw tooth generator 10 is the fine control. By setting resistor 34 to about the center of its range and then adjusting resistor 78, there is a large range wherein all of the raster except the immediate left-hand edge is linear. Resistor 78 can be adjusted so that even the left-hand edge is also linear. Resistor 34 then gives a fine control over the left-hand edge linearity.

It has been found in practice that the following values are suitable for the circuit components in the circuit described in Fig. 1. However, these values are being merely given as an example and it is to be understood that other values may be substituted for any or all of the components if desirable or necessary.

*Resistors*

| | Ohms |
|---|---|
| 126 | 10 |
| 170, 172 | 50 |
| 56, 123, 181, 183 | 100 |
| 134 | 200 |
| 47, 59, 65 | 470 |
| 138 | 630 |
| 98 | 1,600 |
| 82 | 2,000 |
| 148 | 4,000 |
| 49, 112 | 10,000 |
| 94 | 20,000 |
| 76 | 24,000 |
| 34, 78 | 25,000 |
| 169 | 30,000 |
| 26, 54 | 100,000 |
| 28 | 200,000 |
| 61, 63, 81, 86 ----meg-- | 1 |
| 24 ----meg-- | 2.2 |
| 103 ----meg-- | 3 |
| 13 ----meg-- | 4.7 |
| 22 ----meg-- | 5.6 |

*Condensers*

| | |
|---|---|
| 35, 62, 88, 102, 114, 121 ----mf-- | .1 |
| 150, 151 ----mf-- | 20 |
| 32 ----mmf-- | 82 |
| 140 ----mf-- | 100 |
| 30 ----mmf-- | 330 |
| 153, 180 ----mf-- | 2,000 |

*Tubes*

| | |
|---|---|
| 12, 42, 44, 72, 91, 106 | ½ 12 AU7 or 5963 |
| 122 | 6BQ6 GA |
| 154 | 6080 |

Transformer, primary 300 turns, secondary 360 turns (133–174; 300 turns, 174 to 137: 60 turns)

| | |
|---|---|
| 178 ----mhy-- | 80 |
| 176 ----μhy-- | 480 |

Utilizing the components having the circuit values set forth above in a system wherein the horizontal rate of scanning is 15.750 kc., the following values have been measured for the waves depicted in the graphs of Fig. 2. In this connection it is to be noted that the time of a single wave is 63.5 microseconds per period and that the discharge pulse for discharging tube 12 of saw tooth generator 10 has a width of 6 microseconds and is a 30 volt positive pulse. The graph B in Fig. 2 is a positive going saw tooth wave of 4.3 volts, the pulse of graph C is a positive pulse of 20.5 volts with point $C_1$ being at 6½ volts. The pulse of graph D is a positive pulse of 77 volts with the point $D_1$ being at 55 volts. The pulse of graph E is an 81 volt positive pulse with the point $E_1$ being at 34 volts. The current wave through the deflection coil as shown in graph F as measured at point 200, Fig. 1 is 800 ma. The time included between the arrows in graph F is approximately a 10 microsecond interval, the blanking pulse interval.

In the circuit of Fig. 3 which embodies the principles of the invention and is utilizable in a color system wherein three image orthicon tubes are utilized, it is to be noted that the circuit is substantially similar to the circuit of Fig. 1 with a few differences. In this circuit it is to be noted that saw tooth wave generator 10′ is preceded by an amplifier 300 for amplifying the horizontal drive pulses. Since the input to saw tooth wave generator 10′ is a positive going rectangular pulse, the input to the control grid of amplifier 300 is a negative going pulse suitably having the same width as the input pulse to the saw tooth wave generator. Also it is seen that the power amplifier 120′ now comprises two power tubes connected in parallel to permit greater current output therefrom. The damper device 154′ and the three deflection coils are connected in similar arrangement as depicted in Fig. 1. There is provided for each deflection coil a variable inductor *dw* for varying widths, a variable resistor *dQ* for adjusting the "Qs" of the respective coils and parallel combinations of resistors for the introduction of a controlled amount of vertical saw tooth voltage for adjusting skew. The operation of the circuit of Fig. 3 is the same as that of Fig. 1.

While there have been shown particular embodiments of this invention, it will of course be understood that it is not intended to be limited thereto since many modifications both in the circuit arrangements and in the instrumentalities employed therein may be made and it is therefore contemplated by the appended claims to cover any such modifications as fall within the true spirit and scope of the invention.

What is claimed is:

1. A deflecting circuit for a cathode ray comprising a source of cyclically varying current, a transformer having a primary winding and a secondary winding, said primary winding being connected to said source, a cathode ray deflection coil connected in shunt with said secondary winding, the current through said coil increasing to a predetermined value in accordance with the increase in current from said source and the current from said source being cut off after the current through said coil rises to said predetermined value whereby the current in said deflection coil circuit is set into oscillation at a frequency determined by the effective inductance and capacitance of said deflection coil circuit, an electron discharge device including a cathode, a control electrode and an anode for damping said current oscillations after the first-half cycle of oscillations, said damping device having its anode to cathode path connected in shunt with said secondary winding, said source of cyclically varying current comprising means for generating a cyclically varying potential, means responsive to the application thereto of said cyclically varying potential and a potential proportional to the current flowing through said coil for providing a potential in accordance with the difference therebetween, a power tube having an input and an output circuit, means for applying the output of said difference means to the input circuit of said power tube and to the control electrode of said damping device, said transformer coupling the output of said power tube to said deflection coil, said power tube and said damping device being chosen to have respective operating points whereby said power tube is conductive through at least the latter half of the period between the end of one of said first-half cycles of said oscillations and the beginning of the next of said first-half cycles and whereby said damping device is conductive through at least the first half of said period.

2. A deflecting circuit for a cathode ray comprising a source of cyclically varying current, a transformer having a primary winding and a secondary winding, said primary winding being connected to said source, a cathode ray deflection coil connected in shunt with said secondary winding, the current through said coil increasing to a predetermined value in accordance with the increase in current from said source and the current from said source being cut off after the current through said coil rises to said predetermined value whereby the current in said deflection coil circuit after rising to said predetermined value is set into oscillation at a frequency determined by the effective inductance and capacitance of said deflection coil circuit, an electron discharge device including a cathode, a control electrode and an anode for damping said current oscillations after the first-half cycle of said oscillations, said damping device having its anode to cathode path connected in shunt with said secondary winding, said source of cyclically varying current comprising means for generating a cyclically varying potential, means responsive to the application thereto of said cyclically varying potential and a potential proportional to the current flowing through said coil for providing a potential in accordance with a difference therebetween, circuit isolation means, a power tube having an input and an output circuit, means for applying the output of said difference means to the input circuit of said power tube, and to the control electrode of said damping device through said isolation means, said transformer coupling the output of said power tube to said deflection coil, said power tube and said damping device being chosen to have respective operating points whereby said power tube is conductive through at least the latter half of the period between the end of one of said first-half cycles of said oscillations and the beginning of the next of said first-half cycles, and whereby said damping device is conductive through at least the first-half of said period.

3. A deflecting circuit for a cathode ray comprising a source of cyclically varying current, a transformer having a primary winding and a secondary winding, said primary winding being connected to said source, a cathode ray deflection coil connected in shunt with one end of said secondary winding and at an intermediate point on said secondary winding, the current through said coil increasing to a predetermined value in accordance with the increase in current from said source and the current from said source being cut off after the current through said coil rises to said predetermined value whereby the current in said deflection coil circuit is set into oscillation at a frequency determined by the effective inductance and capacitance of said deflection coil circuit, an electron discharge device including a cathode, a control electrode, and an anode for damping said current oscillations after the first-half cycle of said oscillations, said damping device having its anode to cathode path connected in shunt with said secondary winding, said source of cyclically varying current comprising means for generating a cyclically varying potential, means responsive to the application thereto of said cyclically varying potential and a potential proportional to the current flowing through the said coil for providing a potential in accordance with a difference therebetween, a power tube having an input and an output circuit, means for applying the output of said difference means to the input circuit of said power tube and to the control electrode of said damping device, said transformer coupling the output of said power tube to said deflection coil, said power tube and said damping device being chosen to have respective operating points whereby said power tube is conductive through at least the latter half of the period between the end of one of said first-half cycles of said oscillations and the beginning of the next of said first-half cycles and whereby said damping device is conductive through at least the first half of said period.

4. A deflecting circuit for a cathode ray comprising a source of cyclically varying current, a transformer having a primary winding and a secondary winding, said primary winding being connected to said source, a cathode ray deflection coil connected in shunt with one end of said secondary winding and an intermediate point on said secondary winding, the current through said coil increasing to a predetermined value in accordance with the increase in current from said source and the current from said source being cut off after the current through said coil rises to said predetermined value whereby the current in said deflection coil circuit after rising to said predetermined value is set into oscillation at a frequency determined by the effective inductance and capacitance of said deflection coil circuit, an electron discharge device including a cathode, a control electrode and an anode for damping said current oscillations after the first-half cycle of said oscillations, said damping device having its anode to cathode path connected in shunt with said secondary winding, said source of cyclically varying current comprising means for generating a cyclically varying potential, means responsive to the application thereto of said cyclically varying potential and a potential proportional to the current flowing through said coil for providing a potential in accordance with the difference therebetween, a power tube having an input and an output circuit, impedance matching means, means for applying the output of said difference means to the input circuit of said power tube and through said impedance matching means to the control electrode of said damping device, said transformer coupling the output of said power tube to said deflection coil, said power tube and said discharge device being chosen to have respective operating points whereby said power tube is conductive at least through the latter half of the period between the end of one of said first-half cycles of said oscillations and the beginning of the next of said first-half cycles and whereby said damping device is conductive through at least the first-half of said period.

5. A deflection circuit for a cathode ray as defined in claim 4 wherein said means for generating said cyclically varying potential is a saw tooth wave generator.

6. A deflecting circuit for a cathode ray as defined in claim 4 wherein said difference means is a difference amplifier.

7. A deflecting circuit for a cathode ray as defined in claim 4 wherein said impedance matching means is a cathode follower.

8. A deflecting circuit for a cathode ray comprising a source of cyclically varying current, a transformer having a primary winding and a secondary winding, said primary winding being connected to said source, a cathode ray deflection coil connected in shunt with one end of said secondary winding and an intermediate point on said secondary winding, the current through said coil increasing to a predetermined value in accordance with the increase in current from said source and the current from said source being cut off after the current through said coil rises to said predetermined value whereby the current in said deflection coil circuit after rising to said predetermined value is set into oscillation at a frequency determined by the effective inductance and capacitance of said deflection coil circuit, an electron discharge device comprising first and second plates, first and second control electrodes, and first and second common connected cathodes for damping said current oscillations after the first half cycles of said oscillations, said damping device having its respective anode to cathode paths connected in shunt with said secondary windings, said source of cyclically varying current comprising means for generating a potential having a saw tooth wave configuration, a difference amplifier responsive to the application thereto of said saw tooth wave potential and a potential proportional to the current flowing through said coil for providing a potential in accordance with the difference therebetween, a power tube having an input and an output circuit, a cathode follower, means for applying the output of said difference amplifier to the input circuit of said power tube and to the control electrodes of said damping device through said cathode follower, said transformer coupling the output of said power tube to said deflection coil, said power tube and said discharge device being chosen to have respective operating points whereby said power tube is conductive at least through the latter half of the period between the end of one of said first-half cycles of said oscillations and the beginning of the next of said first-half cycles and whereby said damping device is conductive through at least the first-half of said period.

9. A deflecting circuit for a cathode ray as defined in claim 8 wherein said power tube is a vacuum tube pentode.

10. A deflecting circuit for a plurality of cathode rays comprising a source of cyclically varying current, a transformer having a primary winding and a secondary winding, said primary winding being connected to said source, a plurality of cathode ray deflection coils connected in shunt with the end of said secondary winding and an intermediate point on said secondary winding, the current through said coils increasing to a predetermined value in accordance with the increase in current from said source and the current from said source being cut off after the current through the said coil rises to said predetermined value whereby the current in said respective deflection coil circuits after rising to said predetermined value are set into oscillation at a frequency determined by the effective respective inductances and capacitances of said respective deflection coil circuits, an electron discharge device including first and second cathodes, first and second control electrodes, and first and second anodes for damping said current oscillations after the first-half cycle of said oscillations, said damping device having its respective anode to cathode paths respectively connected in shunt with said secondary winding, said source of cyclically varying current comprising means for generating a potential having a saw tooth configuration, a difference amplifier responsive to the application thereto of the output from said saw tooth wave generating means and a potential proportional to the current flowing through said coil for providing a potential in accordance with the difference therebetween, a power tube having an input and an output circuit, a cathode follower, means for applying the output from said difference amplifier to both the control electrodes of said damping device through said cathode follower and to the input circuit of said power tube, said transformer coupling the output of said power tube to said deflection coil, said power tube and said damping device being chosen to have respective operating points whereby said power tube is conductive at least through the latter half of the period between the end of one of said first-half cycles of said oscillations and the beginning of the next of said first-half cycles and whereby said damping device is conductive at least through the first-half of said period.

11. A deflecting circuit as defined in claim 10 wherein said power tube is a double vacuum tube pentode.

No references cited.